(12) United States Patent
Lee et al.

(10) Patent No.: US 10,804,561 B2
(45) Date of Patent: Oct. 13, 2020

(54) CLAMPING DEVICE, AND BATTERY MODULE COMPRISING SAME

(71) Applicant: LG CHEM, LTD., Seoul (KR)

(72) Inventors: Young-Ho Lee, Daejeon (KR); Seong-Tae Kim, Daejeon (KR); Jun-Yeob Seong, Daejeon (KR); Hyuk An, Daejeon (KR); Sang-Yoon Jeong, Daejeon (KR); Yang-Kyu Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 473 days.

(21) Appl. No.: 15/515,067

(22) PCT Filed: Jan. 22, 2016

(86) PCT No.: PCT/KR2016/000733
§ 371 (c)(1),
(2) Date: Mar. 28, 2017

(87) PCT Pub. No.: WO2016/140434
PCT Pub. Date: Sep. 9, 2016

(65) Prior Publication Data
US 2017/0222251 A1    Aug. 3, 2017

(30) Foreign Application Priority Data

Mar. 4, 2015  (KR) .................. 10-2015-0030505

(51) Int. Cl.
*H01M 10/04* (2006.01)
*H01M 2/10* (2006.01)

(52) U.S. Cl.
CPC ..... *H01M 10/0481* (2013.01); *H01M 2/1077* (2013.01); *H01M 2220/20* (2013.01)

(58) Field of Classification Search
CPC ........... H01M 2/1077; H01M 2220/20; H01M 10/0481
(Continued)

(56) References Cited

U.S. PATENT DOCUMENTS 8,999,557 B2   4/2015  Kim
9,337,460 B2   5/2016  Tsuruta et al.
(Continued)

FOREIGN PATENT DOCUMENTS

DE   10 2011 003 538 A1   8/2012
EP       2 541 668 A1     1/2013
(Continued)

OTHER PUBLICATIONS

International Search Report for Application No. PCT/KR16/00733, dated Apr. 8, 2016 (5 pages).

*Primary Examiner* — Jonathan G Jelsma
*Assistant Examiner* — Omar M Kekia
(74) *Attorney, Agent, or Firm* — Morgan, Lewis & Bockius LLP

(57) ABSTRACT

Disclosed are a clamping device and a battery module comprising the same, the clamping device being suitable for reducing the number of screw coupling portions of long bolts at a lower plate, a battery stack, and an upper plate, and for securing, in a balanced manner, the battery stack, the lower plate and the upper plate by means of the long bolts. The clamping device according to the present invention comprises: a support; and pressing parts respectively protruded from one end and the other end of the support, wherein the support and the pressing parts define a bent part along the central portion of the outer circumference while forming a band shape, and the pressing parts include locking holes which intersect with the bent portion.

20 Claims, 9 Drawing Sheets

(58) Field of Classification Search
USPC .......................................................... 429/156
See application file for complete search history.

(56) References Cited

U.S. PATENT DOCUMENTS

| | | | |
|---|---|---|---|
| 2013/0183571 A1 | 7/2013 | Miyazaki et al. | |
| 2013/0183573 A1* | 7/2013 | Yoshioka | H01M 2/1077 429/159 |
| 2013/0273404 A1* | 10/2013 | Ochi | H01M 2/14 429/99 |
| 2013/0309545 A1* | 11/2013 | Daubitzer | H01M 2/1072 429/120 |

FOREIGN PATENT DOCUMENTS

| | | |
|---|---|---|
| KR | 10-2011-0072910 A | 6/2011 |
| KR | 10-2011-0117585 A | 10/2011 |
| KR | 10-2012-0006245 A | 1/2012 |
| KR | 10-2014-0041337 A | 4/2014 |
| KR | 10-2014-0121767 A | 10/2014 |
| KR | 10-2015-0000090 A | 1/2015 |
| KR | 10-2015-0011480 A | 2/2015 |

* cited by examiner

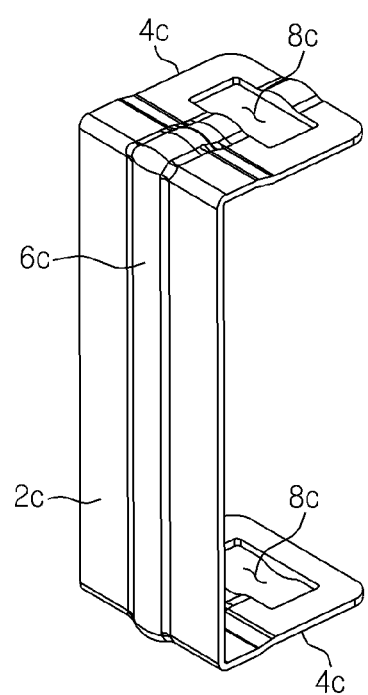

CLAMPING DEVICE, AND BATTERY MODULE COMPRISING SAME

CLAIM TO PRIORITY

The present application claims priority under 35 U.S.C. § 119 to Korean Patent Application No. 10-2015-0030505 filed on Mar. 4, 2015 in the Republic of Korea, and under 35 U.S.C. § 365 to PCT/KR2016/000733, filed on Jan. 22, 2016, the disclosures which are incorporated herein by reference in their entirety.

TECHNICAL FIELD

The present disclosure relates to a clamping device suitable for simplifying an assembly process of constituent elements of a battery pack by minimizing screw coupling portions of the constituent elements, and increasing degree of freedom of arranging the constituent elements by reducing a size of the constituent elements through a miniaturization of the screw coupling portions, and a battery module comprising the same.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and the plug-in hybrid vehicles have an internal combustion engine, an electric motor and a battery pack, and the electric vehicles have an electric motor and a battery pack, but not an internal combustion engine.

Accordingly, the battery pack has evolved in the order of hybrid vehicles, plug-in hybrid vehicles and electric vehicles. The battery pack may be configured to be charged externally from the electric vehicles. The battery pack may include one or more battery modules. The battery module may include battery cells, battery cartridges accommodating the battery cells, and plates covering the battery cartridges in a sandwich structure. The battery cartridges may be formed in a rectangular frame shape and sequentially stacked within the battery module.

Two battery cartridges may be used as one unit such that two battery cartridges may accommodate one or more battery cells therebetween. The plates may be formed in a rectangular panel shape. In an example, the plates and the battery cartridges may be secured with each other by being screw-coupled by long bolts on four edges. Further, the long bolts may secure the plates and the battery cartridges such that the plates and the battery cartridges, and the battery cartridges are aligned with each other.

However, when the long bolts are used for the alignment of the plates and/or the battery cartridges, it is necessary that the battery module is provided with coupling portions for the long bolts on the edges of the plates and the edges of the battery cartridges. The coupling portions for the long bolts may increase the overall size of the plates and the battery cartridges, and utilization of the long bolts may involve simple tasks that have to be repeated as many as a number of the coupling portions in an assembly process of the plates and the battery cartridges, thus lengthening a work time.

Meanwhile, in addition to using the long bolts, aligning the battery cartridges has been suggested, as disclosed in Korean Patent Publication No. 10-2014-0041337, published on Apr. 4, 2014, titled 'Cell Cartridge for battery module and battery module using the same', for example. The battery module may respectively include cells in cell cartridges. The cell cartridges may include frames along sides of a rectangle. The frames may include hooks and slots.

As a result, the cell cartridges may be arranged sequentially within the battery module and snap-coupled with the hooks and the slots. The snap coupling may be implemented to align the cell cartridges within the battery module. However, when the snap coupling of the cell cartridges is used for the alignment of the cell cartridges, the hooks and the slots of the cell cartridges may not properly align the cell cartridges and the plates that cover the cell cartridges in a sandwich structure.

DISCLOSURE

Technical Problem

The present disclosure is designed to solve the problems of the related art, and therefore, the present disclosure is directed to providing a clamping device suitable for reducing the overall size of battery cartridges and plates by minimizing a number of screw coupling portions in the battery cartridges and the plates that cover the battery cartridges in a sandwich structure, properly aligning the battery cartridges and the plates, and simplifying an assembly process of the battery cartridges and the plates, and a battery module comprising the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a clamping device including a support, and pressing parts respectively protruded from one end and the other end of the support, wherein the support and the pressing parts define a bent part along a central region of an outer circumference while forming a band shape, and the pressing parts may include a locking hole intersecting the bent part.

Preferably, the support and the pressing parts may be formed integrally, and bent with respect to each other on each of the one end and the other end of the support.

In one aspect, the support and the pressing parts may be comprised of a metal.

In the present disclosure, the bent part may be convex on the outer circumference of the support and the pressing parts, and concave on an inner circumference opposed to the outer circumference.

In one aspect, the bent part may be convex on an outer circumference of the support and the pressing parts, flat on an inner circumference between locking holes along the support and the pressing parts, and concave on an inner circumference of the pressing parts from the locking holes toward ends of the pressing parts.

In another aspect, the bent part may be convex on an outer circumference of the support and the pressing parts, concave on an inner circumference between locking holes along the support and the pressing parts, and flat on an inner circumference of the pressing parts from the locking holes toward ends of the pressing parts.

In yet another aspect, the bent part may be convex on an outer circumference of the support and the pressing parts, and flat on an inner circumference.

In the present disclosure, the pressing part may be inclined from the support toward the locking hole.

In an example, the pressing part may include at least one bent portion intersecting the bent part between the support and the locking hole.

In the present disclosure, the pressing parts may be extended in one direction from the support.

In one aspect, the locking holes of the pressing parts may have a same central point.

In another aspect, the locking holes of the pressing parts may have a same shape.

In order to achieve the technical objects described above, a battery module is provided, which may include a clamping device formed in a rectangular band shape of which one side is cut, a battery stack positioned within the clamping device, and plates covering the battery stack in a sandwich structure within the clamping device, in which the clamping device may include a support and pressing parts respectively protruded from one end and the other end of the support, the support and the pressing parts may define a bent part along a central region of an outer circumference while contacting the battery stack and the plates, the pressing parts may include a locking hole intersecting the bent part, and the plate may include a locking protrusion inserted into the locking hole.

Preferably, the clamping device may pass through a central region of sidewalls of the plates, at one side portion of the battery stack and the plates.

In one aspect, the clamping device may further include at least one bent portion on the pressing part, intersecting the bent part between the support and the coupling hole, and may be configured to elastically tighten the battery stack and the plates with the support and the pressing parts.

In the present disclosure, locking holes of the pressing parts may be snap-coupled with locking protrusions of the plates or snap-released from the locking protrusions by the bent part.

Preferably, the locking protrusions may be respectively protruded in directions opposite each other in the plates.

In the present disclosure, the battery stack may include battery cartridges overlapping with the locking protrusions, and battery cells between the battery cartridges.

In one aspect, the battery stack and the plates may be secured by long bolts at a side opposite the clamping device.

In another aspect, the clamping device and the plates may be comprised of a metal.

Advantageous Effects

The present disclosure gives the following effects.

A clamping device according to the present disclosure may be positioned on one side portion of the battery cartridges and the plates that cover the battery cartridges in a sandwich structure, and can tighten the battery cartridges and the plates properly in a balanced manner, in cooperation with long bolts that secure the battery cartridges and the plates at a side opposite the one side portion.

The clamping device according to the present disclosure may reduce the overall size of the battery cartridges and the plates by minimizing a number of screw coupling portions on edges of the battery cartridges and the plates.

The clamping device according to the present disclosure may be positioned on one side portion of the battery cartridges and the plates, and can tighten the battery cartridges and the plates satisfactorily in cooperation with the long bolts on a side opposite the one side portion. Therefore, the battery cartridges and the plates can be aligned satisfactorily.

The clamping device according to the present disclosure may simplify an assembly process by reducing repeated assembly steps for the long bolts on edges of the battery cartridges and the plates.

A battery module according to the present disclosure may increase a degree of freedom of arrangement in a space inside the battery because the overall size of the battery cartridge and the plate is reduced.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

FIG. 2C is a perspective view illustrating another modified example of the clamping device of FIG. 2A.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the description provided below, a battery refers to a lithium secondary battery. The "lithium secondary battery" as used herein encompasses a secondary battery in which lithium ions act as the operating ions and thereby inducing electrochemical reaction in the positive electrode and the negative electrode during charging and discharging. However, the present disclosure is obviously not limited to the types of batteries.

Figure 1:
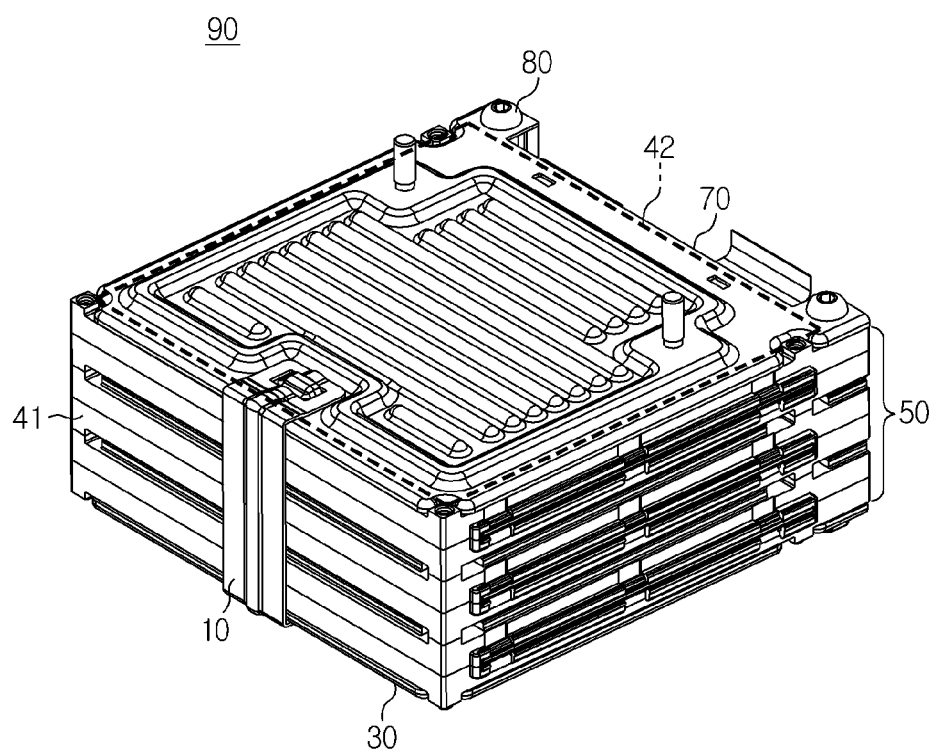
FIG. 1 is a perspective view illustrating a battery module according to an embodiment of the present disclosure.

FIG. 1 is a perspective view illustrating a battery module according to an embodiment of the present disclosure.

Referring to FIG. 1, the battery module 90 according to the present disclosure includes a clamping device 10, a lower plate 30, a battery stack 50, an upper plate 70, and long bolts 80. The clamping device 10 may have a rectangular band shape of which one side is cut. The lower plate 30, the battery stack 50, and the upper plate 70 may be sequentially stacked within the clamping device 10.

In one aspect, the lower plate 30 and the upper plate 70 may be formed in a panel shape. In another aspect, the battery stack 50 may include battery cartridges 41 accommodating battery cells 42. In an example, the clamping device 10 may contact the lower plate 30, the battery stack 50 and the upper plate 70, at one side portion of the lower plate 30, the battery stack 50 and the upper plate 70.

Preferably, the clamping device 10 may contact a central region of a side surface of the lower plate 30, the battery stack 50, and the upper plate 70, at one side portion of the lower plate 30, the battery stack 50 and the upper plate 70. More preferably, the clamping device 10 may be extended by a certain length, past a central region of a side surface of the lower plate 30, the battery stack 50, and the upper plate 70, and toward a center of the lower plate 30 and the upper plate 70.

The long bolts 80 may secure the lower plate 30, the battery stack 50, and the upper plate 70, at side opposite the clamping device 10. Preferably, the clamping device 10, the lower plate 30, and the upper plate 70 may be comprised of a metal material having good durability and heat conductivity.

Figure 2A:
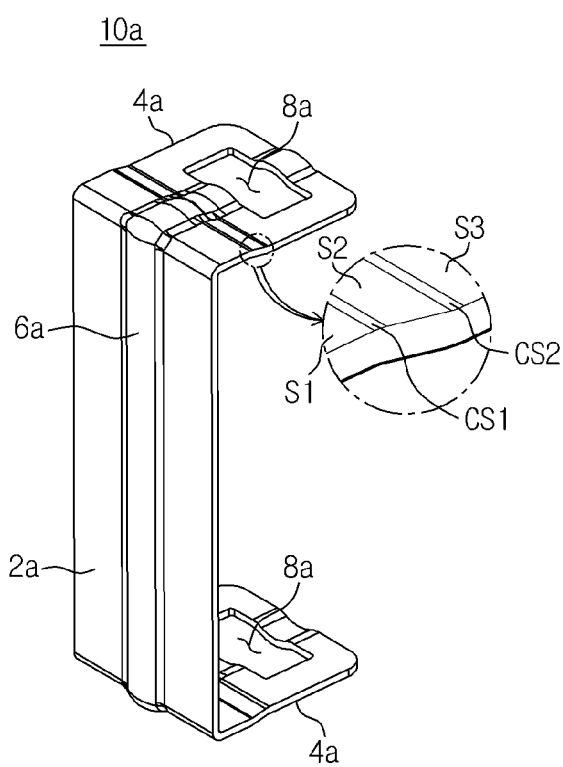
FIG. 2A is a perspective view illustrating the clamping device of FIG. 1.

FIG. 2A is a perspective view illustrating the clamping device of FIG. 1.

Referring to FIG. 2A, the clamping device 10a according to the present disclosure may include a support 2a and pressing parts 4a. The support 2a may have a certain length along one direction. The pressing parts 4a may be respectively protruded from one end and the other end of the support 2a. Preferably, the support 2a and the pressing parts 4a may be formed integrally and bent with respect to each other at one end and the other end of the support 2a, respectively.

More preferably, in one aspect, the support 2a and the pressing parts 4a may be comprised of a metal. The support 2a and the pressing parts 4a may define a bent part 6a along a central region of an outer circumference while forming a band shape. Preferably, the bent part 6a may be convex on an outer circumference of the support 2a and the pressing parts 4a, and concave on an inner circumference opposed to the outer circumference.

Meanwhile, the pressing parts 4a may be extended in one direction from the support 2a. The pressing part 4a may include a locking hole 8a intersecting the bent part 4a. Preferably, the locking hole 8a may pass through the pressing part 4a. The pressing part 4a may be inclined from the support 2a toward the locking hole 8a. Preferably, the pressing part 4a may have bent portions CS1, CS2 intersecting the bent part 6a between the support 2a and the locking hole 8a.

In an example, the pressing part 4a may include a first surface S1 between the support 2a and the bent portion CS1, a second surface S2 between bent portions CS1, CS2, and a third surface S3 between the bent portion CS2 and the locking hole 8a. Preferably, the first surface S1 may be positioned at a level higher than the third surface S3 and substantially horizontal to the third surface S3. The second surface S2 may connect the first surface S1 and the third surface S3, and may be inclined with respect to the first surface S1 and the third surface S3.

The bent part 6a and the bent portions CS1, CS2 may impart the elasticity to the pressing part 4a. Differently from the above, the pressing part 4a may include one bent portion CS1 or CS2 intersecting the bent part 6a between the support 2a and the locking hole 8a. The locking holes 8a may face each other. The locking holes 8a may, or may not have a same central point. The locking holes 8a may, or may not have a same shape.

Figure 2B:
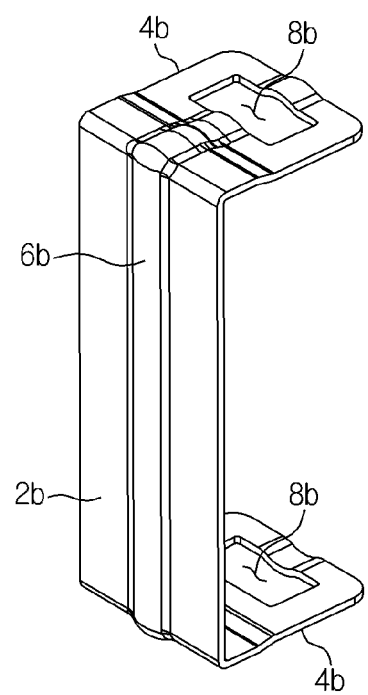
FIG. 2B is a perspective view illustrating a modified example of the clamping device of FIG. 2A.

FIG. 2B is a perspective view illustrating a modified example of the clamping device of FIG. 2A.

Referring to FIG. 2B, the clamping device 10b according to a modified example of the present disclosure may have a similar structure to the clamping device 10a of FIG. 2A. However, the clamping device 10b may have different shapes of the bent part 4b and the locking holes 8b compared to the clamping device 10a of FIG. 2A. More specifically, the bent part 6b may be convex on an outer circumference of the support 2b and the pressing parts 4b, flat on an inner circumference between the locking holes 8b along the support 2b and the pressing parts 4b, and concave on an inner circumference of the pressing parts 4b from the locking holes 8b toward ends of the pressing parts 4b.

Meanwhile, the locking hole 8b may have a different shape from the locking hole 8a of FIG. 2A because of the shape of the bent part 6b on an outer circumference and an inner circumference of the support 2b and the pressing parts 4b. In an example, the clamping device 10b may replace the clamping device 10a.

FIG. 2C is a perspective view illustrating another modified example of the clamping device of FIG. 2A.

Referring to FIG. 2C, the clamping device 10c of another modified example of the present disclosure may have a similar structure to the clamping device 10a of FIG. 2A. However, the clamping device 10c may have different shapes of the bent part 4c and the locking holes 8c compared to the clamping device 10a of FIG. 2A. More specifically, the bent part 6c may be convex on an outer circumference of the support 2c and the pressing parts 4c, concave on an inner circumference between the locking holes 8c along the support 2c and the pressing parts 4c, and flat on an inner circumference of the pressing parts 4c from the locking holes 8c toward ends of the pressing parts 4c.

Meanwhile, the locking hole 8c may have a different shape from the locking hole 8a of FIG. 2A because of the shape of the bent part 6c on an outer circumference and an inner circumference of the support 2c and the pressing parts 4c. In an example, the clamping device 10c may replace the clamping device 10a.

Figure 2D:
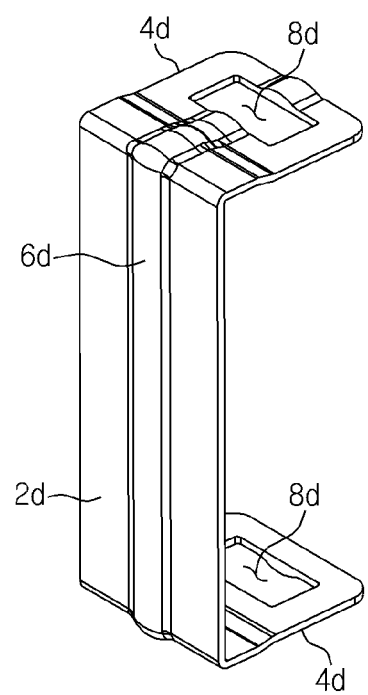
FIG. 2D is a perspective view illustrating another modified example of the clamping device of FIG. 2A.

FIG. 2D is a perspective view illustrating another modified example of the clamping device of FIG. 2A.

Referring to FIG. 2D, the clamping device 10d according to another modified example of the present disclosure may have a similar structure to the clamping device 10a of FIG. 2A. However, the clamping device 10d may have different shapes of the bent part 4d and the locking holes 8d compared to the clamping device 10a of FIG. 2A. More specifically, the bent part 6d may be convex on an outer circumference of the support 2c and the pressing parts 4c, and flat on an inner circumference.

Meanwhile, the locking hole 8d may have a different shape from the locking hole 8a of FIG. 2A because of the shape of the bent part 6d on an outer circumference and an inner circumference of the support 2d and the pressing parts 4d. In an example, the clamping device 10d may replace the clamping device 10a.

Figure 3:
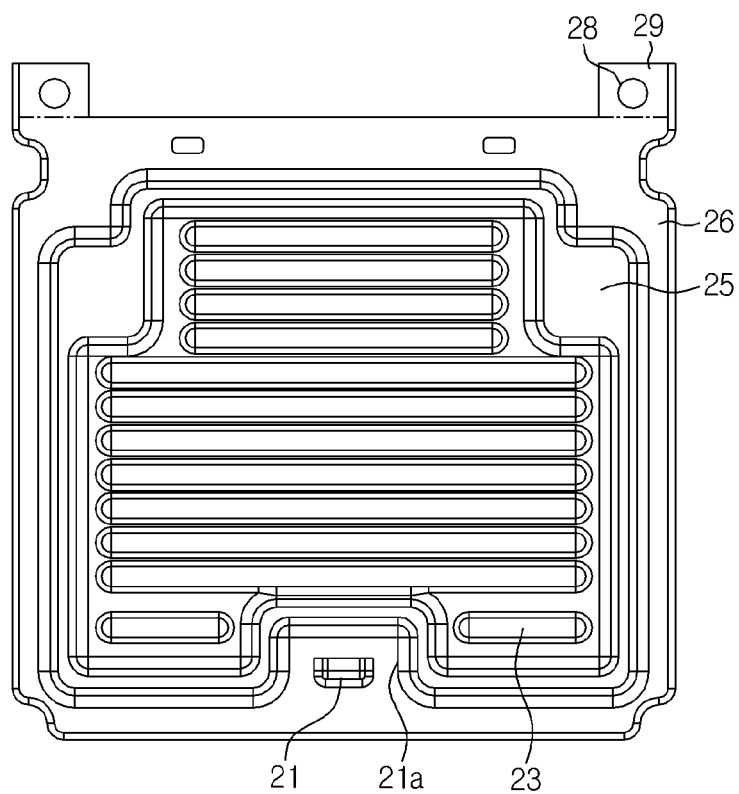
FIG. 3 is a top view illustrating the lower plate of FIG. 1.

FIG. 3 is a top view illustrating the lower plate of FIG. 1.

Figure 6:
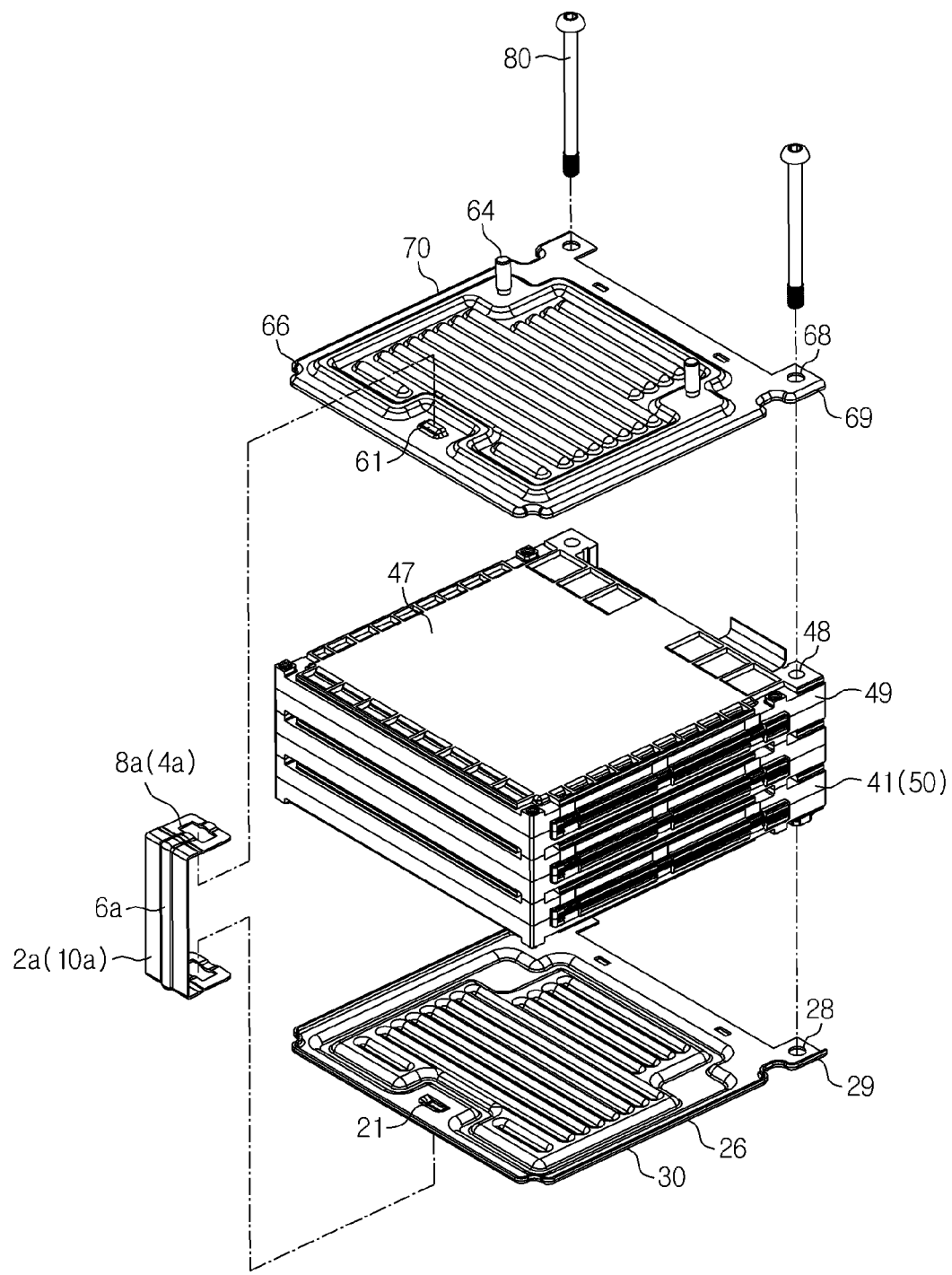
FIG. 6 is an exploded perspective view explaining an assembly process of the battery module of FIG. 1.

Referring to FIG. 3, the lower plate 30 according to the present disclosure may include a lower cover 26 and a lower coupling portion 29. The lower cover 26 may include a lower locking protrusion 21, lower beads 23, and a lower dam 25, which are protruded on one surface and concave on another surface as illustrated in FIG. 6. The lower locking protrusion 21 may be positioned on the lower cover 26, externally from the lower dam 25.

Preferably, the lower locking protrusion 21 may be positioned within a curved portion 21a of the lower dam 25 at an edge of the lower cover 26. In one aspect, the lower locking protrusion 21 may be inserted into one of the locking holes 8a of the clamping device 10 in FIG. 2. The lower beads 23 may be positioned within the lower dam 25 of the lower cover 26. Preferably, the lower beads 23 may increase a surface area of the lower cover 26, and contribute to quickly charging the heat generated from the repeated charging and discharging of a battery 42 of FIG. 4 to outside.

Meanwhile, each of the lower coupling portions 29 may be positioned on a periphery of an edge of the lower cover 26, at a side opposite the lower locking protrusion 21. Preferably, the lower coupling portion 29 may be protruded from an edge of the lower cover 26. The lower coupling portion 29 may include a lower coupling hole 28. The lower coupling hole 28 may be screw-coupled with the long bolt 80 of FIG. 1 through a thread positioned on an inner surface thereof.

Figure 4:
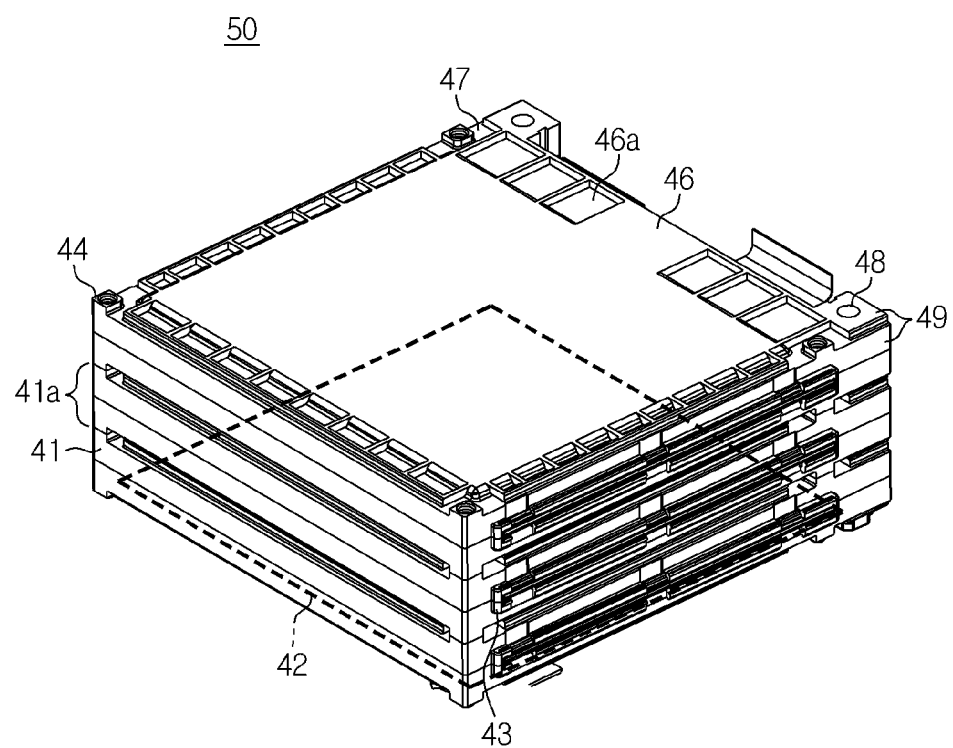
FIG. 4 is a perspective view illustrating the battery stack of FIG. 1.

FIG. 4 is a perspective view illustrating the battery stack of FIG. 1.

Referring to FIG. 4, the battery stack 50 according to the present disclosure may include the battery cartridge 41. A set 41a of two battery cartridges 41 may be sequentially stacked. Preferably, each of the battery cartridges 41 in one set 41a may include one battery cell 42. Within the one set 41a, the battery cartridges 41 may be secured by fasteners 43 respectively positioned on both side portions.

Preferably, in the battery cartridges 41 of the one set 41a, constituent elements of the fastener 43 of the one battery cartridge 41 may be hook-coupled with constituent elements of the fastener 43 of the other battery cartridges 41. Meanwhile, the battery cartridge 41 may include a seating portion 47 and a middle coupling portion 49. The seating portion 47 may have the battery 42 seated thereon in the battery cartridge 41 or have the lower plate 30 of FIG. 3 and the upper plate 70 of FIG. 5 seated on an outermost circumference of the battery cartridges 41.

The seating portion 47 may include aligners 44 on an edge and a spacer 46 on a central region. The aligners 44 may include a groove on the one battery cartridge 41 of the one set 41a as illustrated, or include a protrusion (not illustrated) on the other battery cartridges 41 of the one set 41a. Preferably, the battery cartridges 41 may be aligned by the coupling of the grooves and the protrusions, by the aligners 44 between the sets 41a.

The spacer 46 may be positioned between the sets 41a to separate the battery cartridges 41 on the basis of a unit of one set 41a. Preferably, the spacer 46 may include the beads 46a to provide the rigidity to the battery cartridges 41. Meanwhile, the middle coupling portions 49 may be positioned on a periphery of edges of the seating portion 47 at a side opposite the aligners 44. The middle coupling portions 49 may respectively include a middle coupling hole 48. The middle coupling hole 48 may receive the long bolt 80 of FIG. 1.

Figure 5:
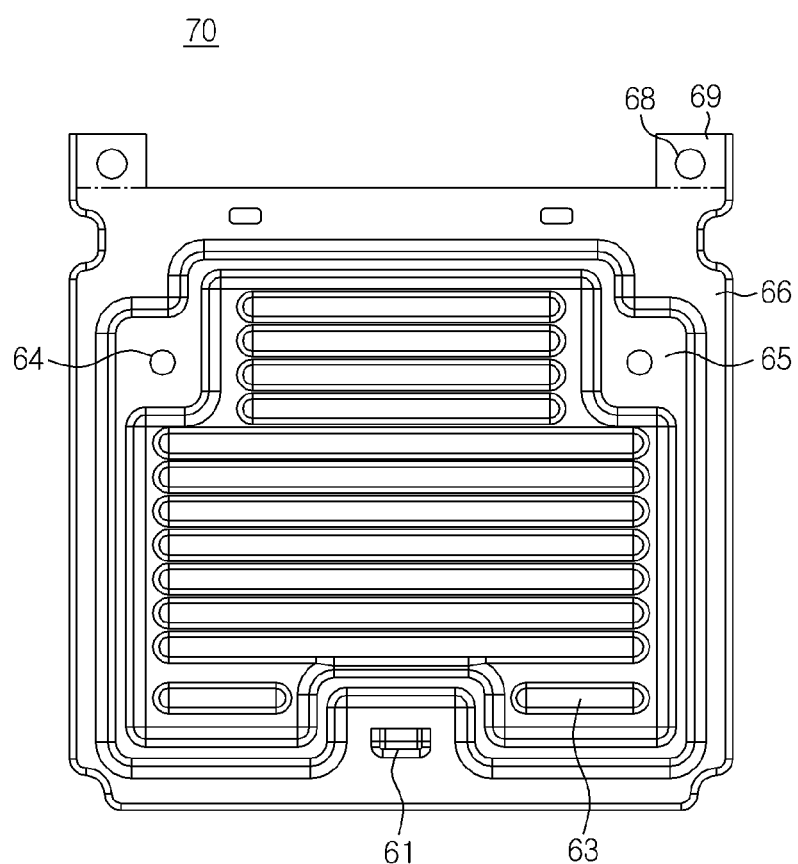
FIG. 5 is a top view illustrating the upper plate of FIG. 1.

FIG. 5 is a top view illustrating the upper plate of FIG. 1.

Referring to FIG. 5, the upper plate 70 according to the present disclosure may have a similar shape to the lower plate 30 of FIG. 3. That is, the upper plate 70 may include an upper cover 66, and an upper locking protrusion 61, upper beads 63, and an upper dam 65 of the upper cover 66 may have same shapes and may perform same functions as a lower locking protrusion 21, lower beads 23, and a lower dam 25 of the lower cover 26.

However, differently from the lower cover 26, the upper cover 66 may include seating protrusions 64 on the upper dam 65. A three-dimensional shape of the seating protrusions 64 is specifically illustrated in FIG. 6. Further, the upper plate 70 may include upper coupling portions 69 respectively positioned on edges of the upper cover 66 at a side opposite the upper locking protrusion 61. Each of the upper coupling portion 69 may include an upper coupling hole 68 for receiving the long bolt 80 of FIG. 1.

FIG. 6 is an exploded perspective view explaining an assembly process of the battery module of FIG. 5.

Referring to FIG. 6, the clamping device 10, the lower plate 30, the battery stack 50, the upper plate 70, and the long bolt 80 may be prepared. The clamping device 10, the lower plate 30, the battery stack 50, the upper plate 70, and the long bolt 80 have been specifically explained in FIGS. 1 to 5. However, for more understanding of the present disclosure, the clamping device 10, the lower plate 30, the battery stack 50, the upper plate 70, and the long bolt 80 will be briefly explained below.

Preferably, the clamping device 10a may include the support 2a and the pressing parts 4a respectively protruded from one end and the other end of the support 2a. The support 2a and the pressing parts 4a may define the bent part 6a, and each of the pressing parts 4a may respectively include the locking hole 8a intersecting the bent part 6a. Additionally, the clamping device 10a may include the bent portions CS1, CS2 on the pressing part 4a, which are intersected with the bent part 6a between the support 2a and the coupling hole 8a.

The lower plate 30 and the upper plate 70 may include the lower locking protrusion 21 and the upper locking protrusion 61. Preferably, the lower and upper locking protrusions 21, 61 may be respectively protruded in directions opposite each other on the lower and upper plates 30, 70. The battery stack 50 may include the battery cell 42 between the battery cartridges 41 so as to overlap with the lower and upper locking protrusions 21, 61, as illustrated in FIG. 1. The long bolts 80 may include a thread only on the lower portion.

Next, the lower plate 30, the battery stack 50, and the upper plate 70 may be stacked sequentially. In this case, the seating portions 47 of the battery cartridges 41 of the battery stack 50 may be positioned between the lower cover 26 of the lower plate 30 and the upper cover 66 of the upper plate 70. In an example, although not illustrated in the drawings, the seating protrusions 64 of the upper plate 70 may be used as a connection plug upon being coupled with the structure (e.g., electric field component or battery module) that may be provided later.

Further, the middle coupling portions 49 of the battery cartridges 41 may be positioned between the lower coupling portion 29 of the lower plate 30 and the upper coupling portion 69 of the upper plate 70. Next, the clamping device 10 may be inserted into the lower plate 30, the battery stack 50, and the upper plate 70. Preferably, the support 2a and the pressing parts 4a of the clamping device 10 may be in contact with the lower plate 30, the battery stack 50, and the upper plate 70.

More preferably, the locking holes 8a of the pressing parts 4a may be respectively inserted into the lower locking protrusion 21 of the lower plate 30 and the upper locking protrusion 61 of the upper plate 70. In an example, the support 2a and the pressing parts 4a may elastically tighten the lower plate 30, the battery stack 50, and the upper plate 70, by using the bent part 6a and the bent portions CS1, CS2.

In one aspect, because the support 2a and the pressing parts 4a have the elasticity, using the bent part 6a, the locking holes 8a of the pressing parts 4a may be snap-coupled with the lower and upper locking protrusions 21, 61 of the lower and upper plates 30, 70, or snap-released from the locking protrusions 21, 61. Thereafter, on a side opposite the clamping device 10a, the long bolts 80 may be inserted into the lower plate 30, the battery stack 50, and the upper plate 70.

Specifically, the long bolts 80 may be received in the upper coupling holes 68 of the upper coupling portions 69 and the middle coupling holes 48 of the middle coupling portions 49, and screw-coupled with the lower coupling hole 28 of the lower coupling portion 29. As a result, the battery module 90 of FIG. 1 may be constructed, as the long bolts 80 secure the lower plate 30, the battery stack 50, and the upper plate 70 with the clamping device 10.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A clamping device, comprising:
    a support; and
    pressing parts respectively protruded from one end and the other end of the support,
    wherein a bent part is included in a central region of each of the support and the pressing parts;
    wherein the bent part has a band shape in the central region of each of the support and the pressing parts relative to outer regions of the support and the pressing parts; and
    wherein the band shape extends along an outer circumference of the support and the pressing parts, and the pressing parts comprise a locking hole intersecting the bent part.

2. The clamping device of claim 1, wherein the support and the pressing parts are formed integrally, and bent with respect to each other on each of the one end and the other end of the support.

3. The clamping device of claim 1, wherein the support and the pressing parts are comprised of a metal.

4. The clamping device of claim 1, wherein the bent part is convex on the outer circumference of the support and the pressing parts, and concave on an inner circumference opposed to the outer circumference.

5. The clamping device of claim 1, wherein the bent part is convex on an outer circumference of the support and the pressing parts, flat on an inner circumference between locking holes along the support and the pressing parts, and concave on an inner circumference of the pressing parts from the locking holes toward ends of the pressing parts.

6. The clamping device of claim 1, wherein the bent part is convex on an outer circumference of the support and the pressing parts, concave on an inner circumference between locking holes along the support and the pressing parts, and flat on an inner circumference of the pressing parts from the locking holes toward ends of the pressing parts.

7. The clamping device of claim 1, wherein the bent part is convex on an outer circumference of the support and the pressing parts, and flat on an inner circumference.

8. The clamping device of claim 1, wherein the pressing part is inclined from the support toward the locking hole.

9. The clamping device of claim 1, wherein the pressing part comprises at least one bent portion intersecting the bent part between the support and the locking hole.

10. The clamping device of claim 1, wherein the pressing parts are extended in one direction from the support.

11. The clamping device of claim 1, wherein the locking holes of the pressing parts have a same central point.

12. The clamping device of claim 1, wherein the locking holes of the pressing parts have a same shape.

13. A battery module, comprising:
    a clamping device formed in a rectangular band shape of which one side is cut;
    a battery stack positioned within the clamping device; and
    plates covering the battery stack in a sandwich structure within the clamping device,
    wherein the clamping device comprises a support and pressing parts respectively protruded from one end and the other end of the support,
    a bent part is included in a central region of each of the support and the pressing parts while contacting the battery stack and the plates,
    the bent part has a band shape in the central region of each of the support and the pressing parts relative to outer regions of the support and the pressing parts,
    the band shape extends along an outer circumference of the support and the pressing parts,
    the pressing parts comprise a locking hole intersecting the bent part, and
    the plates comprise a locking protrusion inserted into the locking hole.

14. The battery module of claim 13, wherein the clamping device passes through a central region of sidewalls of the plates, at one side portion of the battery stack and the plates.

15. The battery module of claim 13, wherein the clamping device further comprises at least one bent portion on the pressing part, intersecting the bent part between the support and the coupling hole, and is configured to elastically tighten the battery stack and the plates with the support and the pressing parts.

16. The battery module of claim 13, wherein locking holes of the pressing parts are snap-coupled with locking protrusions of the plates or snap-released from the locking protrusions by the bent part.

17. The battery module of claim 13, wherein the locking protrusions are respectively protruded in directions opposite each other in the plates.

18. The battery module of claim 13, wherein the battery stack comprises battery cartridges overlapping with the locking protrusions, and battery cells between the battery cartridges.

19. The battery module of claim 13, wherein the battery stack and the plates are secured by long bolts at a side opposite the clamping device.

20. The battery module of claim 13, wherein the clamping device and the plates are comprised of a metal.

* * * * *